(12) United States Patent
Kaplan

(10) Patent No.: US 12,028,448 B2
(45) Date of Patent: Jul. 2, 2024

(54) METHOD AND DEVICE FOR QUANTUM COMPUTATION DELEGATED TO A QUANTUM SERVER BY A CLIENT FOR THE CREATION OF A QUANTUM STATE KNOWN TO THE CLIENT PURPOSE CONCEALED FROM THE QUANTUM SERVER

(71) Applicant: VERIQLOUD, Montrouge (FR)

(72) Inventor: Marc Kaplan, Montrouge (FR)

(73) Assignee: VERIQLOUD, Montrouge (FR)

( * ) Notice: Subject to any disclaimer, the term of this patent is extended or adjusted under 35 U.S.C. 154(b) by 427 days.

(21) Appl. No.: 17/418,236

(22) PCT Filed: Dec. 19, 2019

(86) PCT No.: PCT/EP2019/086485
§ 371 (c)(1),
(2) Date: Jun. 24, 2021

(87) PCT Pub. No.: WO2020/136097
PCT Pub. Date: Jul. 2, 2020

(65) Prior Publication Data
US 2022/0085985 A1 Mar. 17, 2022

(30) Foreign Application Priority Data
Dec. 26, 2018 (FR) ...................................... 1874163

(51) Int. Cl.
*H04L 29/06* (2006.01)
*G06N 10/00* (2022.01)
*H04L 9/08* (2006.01)

(52) U.S. Cl.
CPC .......... *H04L 9/0852* (2013.01); *G06N 10/00* (2019.01); *H04L 2209/04* (2013.01)

(58) Field of Classification Search
CPC ... H04L 9/0852; H04L 2209/04; G06N 10/00; G06N 10/40; G06N 10/20
See application file for complete search history.

(56) References Cited

U.S. PATENT DOCUMENTS 8,897,449 B1 * 11/2014 Broadbent ............ H04L 9/0891
380/278
2017/0324551 A1 * 11/2017 Ahn ...................... H04L 9/0855
(Continued)

FOREIGN PATENT DOCUMENTS

CN 107493295 A * 12/2017 ......... H04L 63/0815
CN 108388946 A * 8/2018 ............. G06N 10/00
(Continued)

OTHER PUBLICATIONS

Fitzsimons, Joseph F. "Private quantum computation: an introduction to blind quantum computing and related protocols." npj Quantum Information 3.1 (2017) (Year: 2017).*
(Continued)

*Primary Examiner* — Yogesh Paliwal

(57) ABSTRACT

The present invention is related to a method for delegation by a client of the creation of an unknown quantum state to a quantum server, the client having a simplified architecture based on a beam splitter, and the delegation method comprising in particular steps of activating an interaction through the beam splitter and masking by means of delays.

15 Claims, 7 Drawing Sheets

(56) References Cited

U.S. PATENT DOCUMENTS

Figure 1:
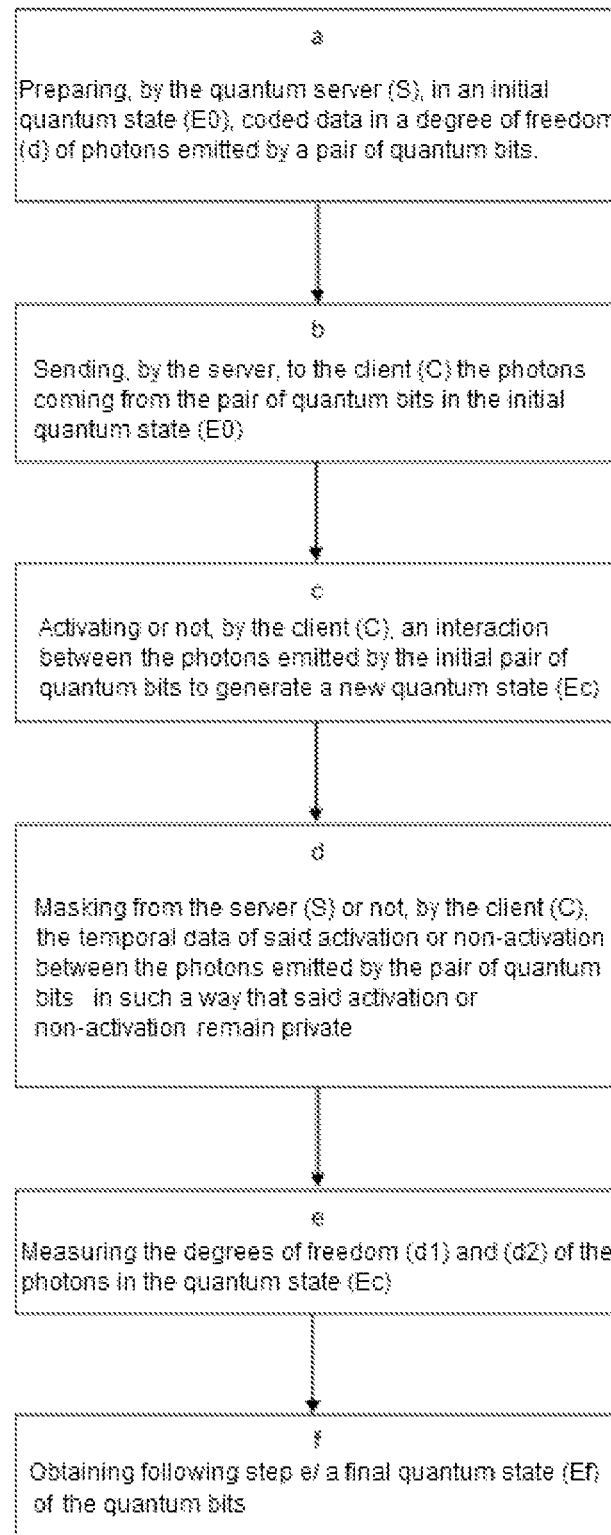

2018/0149476 A1* 5/2018 Huang .................. H04B 10/70
2018/0262276 A1* 9/2018 Bishop .................. H04B 10/70

FOREIGN PATENT DOCUMENTS

| CN | 108388946 A | | 8/2018 | |
|---|---|---|---|---|
| CN | 108847934 A | * | 11/2018 | ......... H04L 63/0428 |
| WO | WO-2015121619 A3 | * | 2/2016 | ........... G06N 99/002 |
| WO | 2020136097 A1 | | 7/2020 | |

OTHER PUBLICATIONS

Zeuner et al., "Experimental Quantum Homomorphic Encryption", arXiv, eprint=1803.10246, 2018. (Year: 2018).*

Kashefi, Elham, and Anna Pappa. "Multiparty delegated quantum computing." Cryptography 1.2 (2017) (Year: 2017).*

Foreign Communication from a Related Counterpart Application, International Search Report dated Jan. 30, 2020, International Application No. PCT/EP2019/086485 filed on Dec. 19, 2019.

Foreign Communication from a Related Counterpart Application, Written Opinion dated Jan. 30, 2020, International Application No. PCT/EP2019/086485 filed on Dec. 19, 2019.

Xiaoqian Shang, et al., "Measurement-based universal blind quantum computation with minor resources" arxiv.org, Cornell University Library, 201 Olin Library Cornell University Ithaca, NY 14853, Jan. 10, 2018 XP081074121.

Julius Wallnofer, et al., "Multipartite state generation in quantum networks with optimal scaling" arxiv.org, Cornell University Library, 201 Olin Library Cornell University Ithaca, NY 14853, Jun. 29, 2018, XP080896147.

Tomoyuki Morimae and Keisuke Fujii "Secure Entanglement Distillation for Double-Server Blind Quantum Computation" Physical Review Letters, American Physical Society, US, vol. 111, No. 2, Jul. 9, 2013, pp. 20502-1, DOI: 10.1103/PHYSREVLETT.111.020502, ISSN: 0031-9007, XP002751535.

* cited by examiner d: Polarisation $|H> = |0>$ $|V> = |1>$ $|\varphi> = a|0> + b|1>$ d: Phase $|0> = |\alpha>$ $|1> = e^{i\frac{\pi}{2}}|\alpha>$

METHOD AND DEVICE FOR QUANTUM COMPUTATION DELEGATED TO A QUANTUM SERVER BY A CLIENT FOR THE CREATION OF A QUANTUM STATE KNOWN TO THE CLIENT PURPOSE CONCEALED FROM THE QUANTUM SERVER

CROSS-REFERENCE TO RELATED APPLICATIONS

The present application is a filing under 35 U.S.C. 371 as the National Stage of International Application No. PCT/EP2019/086485, filed Dec. 19, 2019, entitled "METHOD AND DEVICE FOR QUANTUM COMPUTATION DELEGATED TO A QUANTUM SERVER BY A CLIENT FOR THE CREATION OF A QUANTUM STATE KNOWN TO THE CLIENT PURPOSE CONCEALED FROM THE QUANTUM SERVER," which claims priority to French Application No. 1874163 filed with the Intellectual Property Office of France on Dec. 26, 2018, both of which are incorporated herein by reference in their entirety for all purposes.

The present invention generally relates to a method of quantum computation implemented by the association of a client device with a quantum server device and using a simplified architecture.

Quantum calculators are devices that use the quantum properties of the material to perform operations on data, or quantum information. The unit of quantum information is called "qubit" or quantum bit. Communications between different calculators, optical or non-optical, are possible, by transmission of photons or of electromagnetic signals that encode the quantum information.

In practice, the carrying out of the coding of a quantum bit can be carried out by using trapped ions subjected to a well-defined electromagnetic field, doped diamonds, or superconducting quantum bits. The coding of the quantum bit is done by the control of a transition between two energy levels of the particles, for example between the fundamental state and an excited state with an optical transition (by interaction with a laser beam for example), emitting or receiving a photon of a wavelength characteristic of the controlled energy transition.

It is known by those skilled in the art that it is possible to delegate a computation to a quantum server device by a client device in a secure manner. This task is called blind quantum computing. The first practical realisation of such a computation was proposed by Broadbent et al. in "Universal blind quantum computation", Proceedings of the 50th Annual IEEE Symposium on Foundations of Computer Science (FOCS 2009), pp. 517-526. In their protocol, the client device prepares and sends to the server device randomly chosen single qubits (encoded on photons), on which the server device carries out a series of operations controlled by the client device, according to the results of the measurements obtained at each step. The key of the protocol resides in the fact that the photons are not perfectly distinguishable, and that the server device performs a computation in the form of a series of measurements without knowing the states on which the measurements are taken.

It is moreover known to be able to create quantum entanglement between 2 systems through the use of linear optical devices such as a beam splitter, as shown for example in "Bell's-inequality experiments using independent-particle sources", Bernard Yurke and David Stoler, Phys. Rev. A 46, 2229 (1992). Quantum entanglement is the phenomenon whereby 2 separate systems form a linked system and have quantum states that depend on each other regardless of the distance that separates them.

The technical problem that the applicant proposes to resolve is similar to the computation delegation to a quantum server and consists in the delegation by a client of the creation of an unknown quantum state to a quantum server.

In order to resolve this problem, the applicant has developed a method for the secure generation of a quantum state Ef by a quantum server S delegated by a client C, the generation method being characterised in that it comprises the following steps: a/ preparing, by the quantum server S, in an initial quantum state E0 coded data in a degree of freedom d1 or d2 of photons emitted by a pair of quantum bits, where the degree of freedom d1, respectively d2, of each photon emitted is entangled with the quantum bit emitting the photon; b/ sending, by the quantum server, to the client C the photons coming from the pair of quantum bits in the initial quantum state E0; c/ activating or not, by the client C, an interaction between the photons emitted by the initial pair of quantum bits to generate a new quantum state Ec; d/ masking or not, by the client C, the temporal data of said activation or non-activation and of said interaction or non-interaction between the photons emitted by the pair of quantum bits in such a way that said activation or non-activation and interaction or non-interaction remain private; e/ measuring the degrees of freedom d1 and d2 of the photons in the quantum state Ec generated at step c/; f/ obtaining following step e/ a final quantum state Ef of the quantum bits.

Note that the description presented here considers a system with two quantum bits, but, more generally, a sequence of several pairs of quantum bits can be considered.

Particular characteristics or embodiments, that can be used alone or in combinations where possible, are:

the interaction between the photons emitted by the pair of quantum bits consists of a two-photon interference that is produced at the input of a beam splitter BS;

the masking of the temporal data of said activation and of said interaction between the photons emitted by the pair of quantum bits is carried out by the introduction in steps c/ and d/ of delays, chosen by the client C, between the paths followed by each one of the photons coming from the pair of quantum bits in the initial quantum state E0; —step e/ of the method for the secure generation of a quantum state Ef can be carried out either by the quantum server S, or by the client C.

In the case where step e/ of the method for the secure generation of a quantum state Ef is carried out by the quantum server S, the method for the secure generation of a quantum state Ef is characterised by the elements hereinbelow:

the masking of step d/ is carried out; —an intermediate step d'/ between the steps d/ and e/ is carried out, said step d'/ consisting in sending by the client C the photons in the quantum state Ec generated at step c/ to the quantum server S;

the step e/ of measuring degrees of freedom d1 and d2 of the photons in the quantum state Ec is carried out by the quantum server S;

an additional step g/ is carried out, said step g/ consisting of sending by the server S the result of the measurement taken in step e/.

In this case, the objective of the application is also a device for the implementation of the method for the secure generation of a quantum state Ef, wherein:

the quantum server S comprises:
i. a generator of solid-state quantum bits emitting photons via the application of an electromagnetic field,
ii. two first and second detectors of single photons DDau, DDbu, intended for delivering first measurement signals Dau, Dbu, and two third and fourth detectors of single photons DDad, DDbd, intended for delivering second measurement signals Dad, Dbd;

the client C comprises:
i. a beam splitter BS being intended for receiving two photons emitted by the pair of quantum bits in the quantum state E0,
ii. first and second delays D1 and D2 of the delay line type placed at the input of each one of the input faces of the beam splitter BS that can be activated by the client C and intended for introducing a temporal delay on the beam passing through them,
iii. first and second means Mu and Md of spatial splitting of photons with different degrees of freedom da and db placed respectively at the output of each one of the reflection and transmission directions of the beam splitter BS,
iv. third and fourth delays D3 and D4 of the delay line type placed at the output of each one of the output faces of the first means Mu of spatial splitting of photons with different degrees of freedom da and db, that can be activated by the client C and intended for introducing a temporal delay on the beam passing through them,
v. fifth and sixth delays D5 and D6 of the delay line type placed at the output of each one of the output faces of the second means Md of spatial splitting of photons with different degrees of freedom da and db, that can be activated by the client C and intended for introducing a temporal delay on the beam passing through them, in such a way that the beam splitter BS of the client C is placed at the output of the generator of solid-state quantum bits of the quantum server S and the third, fourth, fifth and sixth delays, D3, D4, D5 and D6 of the client C are respectively placed at the input of the first and second photon detectors Ddau, DDbu and of the third and fourth photon detectors DDbd, DDad of the quantum server S.

More precisely, the first and second photon detectors DDau, DDbu detect photons with a degree of freedom Da (for example horizontal polarisation if the degree of freedom is the polarisation of the photon) and Db (for example vertical polarisation if the degree of freedom is the polarisation of the photon) respectively, and the third and fourth photon detectors DDbd, DDad detect photons with a degree of freedom Db and Da respectively.

In the case where step e/ of the method for the secure generation of a quantum state Ef is carried out by the client C, the method for the secure generation of a quantum state Ef is characterised by the elements hereinbelow:

the masking of step d/ is not carried out;
the step e/ of measuring degrees of freedom d1 and d2 of the photons in the quantum state Ec is carried out by the client (C);
step f/ is produced following the measurement of the degrees of freedom d1 and d2 of the photons in the quantum state Ec due to the entanglement between the degrees of freedom d1 and d2 of the photons and the quantum bits from the quantum server S emitting them, said entanglement inducing a new quantum state Ef of the quantum bits.

In this case, the object of the application is also a device for the implementation of the method for the secure generation of a quantum state Ef, wherein the quantum server S comprises a generator of solid-state quantum bits emitting or coupled with photons via the application of an electromagnetic field, and the client C comprises:
i. a beam splitter BS being intended for receiving two photons emitted by the pair of quantum bits in the quantum state E0,
ii. first and second delays D1 and D2 of the delay line type placed at the input of each one of the input faces of the beam splitter BS that can be activated by the client C and intended for introducing a temporal delay on the beam passing through them,
iii. first and second means Mu and Md of spatial splitting of photons with different degrees of freedom da and db placed respectively at the output of each one of the reflection and transmission directions of the beam splitter BS,
iv. third and fourth delays D3 and D4 of the delay line type placed at the output of each one of the output faces of the first means Mu of spatial splitting of photons with different degrees of freedom da and db, preferably set to zero by the client C,
v. fifth and sixth delays D5 and D6 of the delay line type placed at the output of each one of the output faces of the second means Md of spatial splitting of photons with different degrees of freedom da and db, preferably set to zero by the client C,
vi. two first and second detectors of single photons DDau, DDbu, intended for delivering first measurement signals Dau, Dbu, and two third and fourth detectors of single photons DDad, DDbd, intended for delivering second measurement signals Dad, Dbd, in such a way that the beam splitter BS of the client C is placed at the output of the generator of solid-state quantum bits of the quantum server S and the third, fourth, fifth and sixth delays, D3, D4, D5 and D6 of the client C are respectively placed at the input of the first and second photon detectors DDau, DDbu and of the third and fourth photon detectors DDbd, DDad of the client C.

In practice, the carrying out of the coding of a quantum bit can be carried out by using trapped ions, doped diamonds, or superconducting quantum bits subjected to a well-defined electromagnetic field.

In the case of superconducting quantum bits, experimentally, a device that makes it possible to transform the frequency of the magnetic field of the microwaves to the optical domain can be inserted between the client and the server, as described in the reference Physical Review A. 96.013833 "Microwave-to-optical frequency conversion using a cesium atom coupled to a superconducting resonator", B. T. Gard, K. Jacobs, R. McDermott, and M. Saffman.

Likewise as hereinabove, the first and second photon detectors Ddau, DDbu detect photons with a degree of freedom Da and Db respectively, and the third and fourth photon detectors DDbd, DDad detect photons with a degree of freedom Db and Da respectively.

Generally, an advantage of the solution proposed in the present application is that the solid-state quantum bit never needs to absorb photons. The task carried out by the solid-state quantum bit resides in the emission of an entangled photon with its state, but no value is transmitted by the client or stored in the quantum memory of the server.

Another advantage of the solution proposed in the present application resides in the fact that the server no longer carries out any operation on two quantum bits, indeed all the operations on two quantum bits are carried out by the client.

Moreover, when the client C and the quantum server S are spatially close to one another, the client C can be included in a sealed housing.

Figure 2:
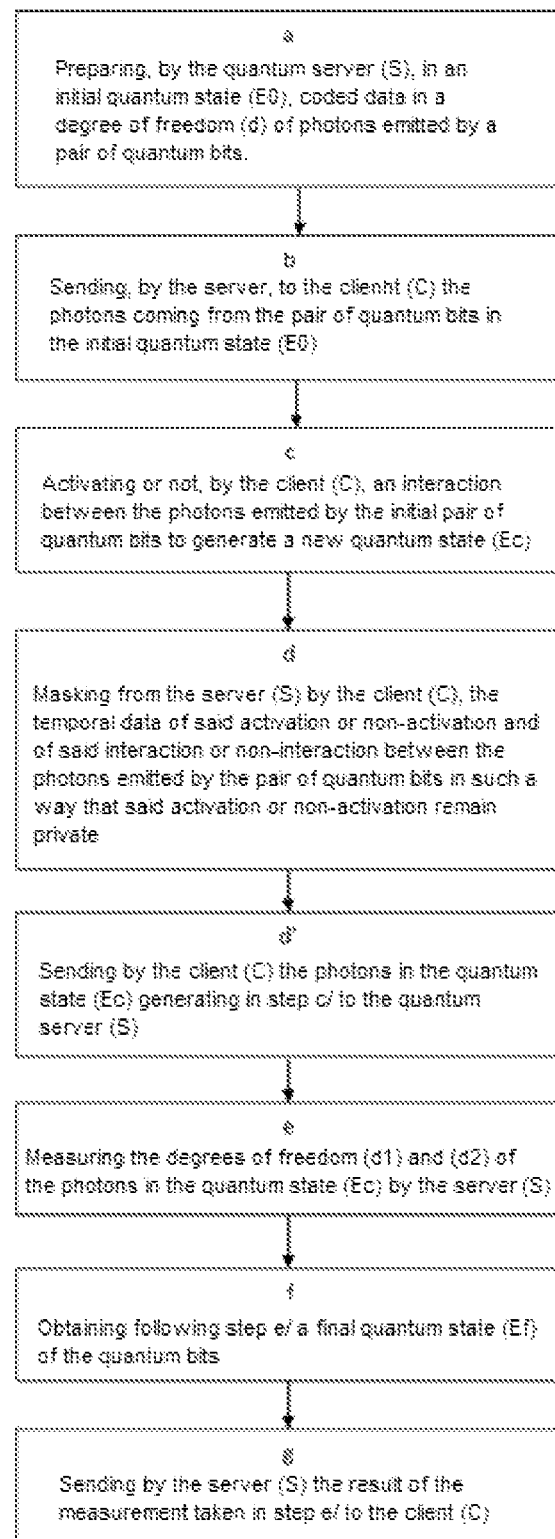
Figure 3:
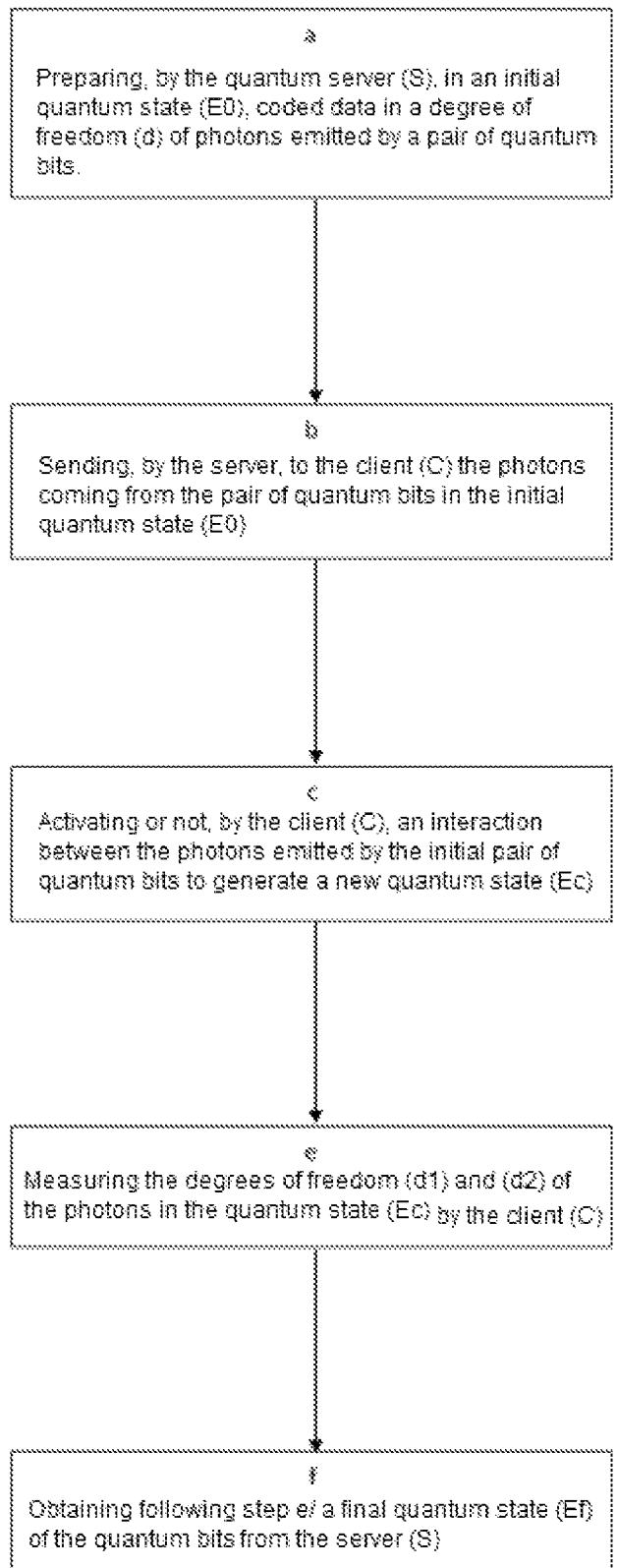
Figure 4:
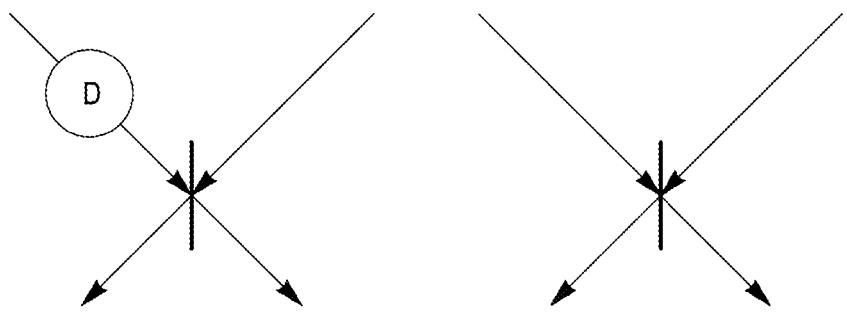
Figure 5A:
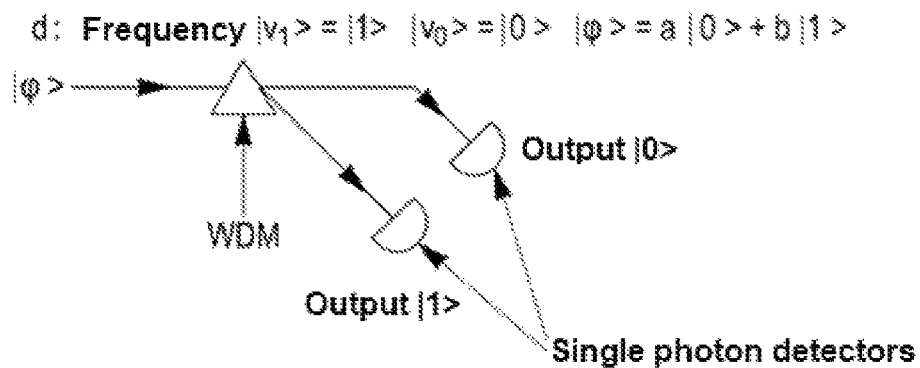
Figure 5B:
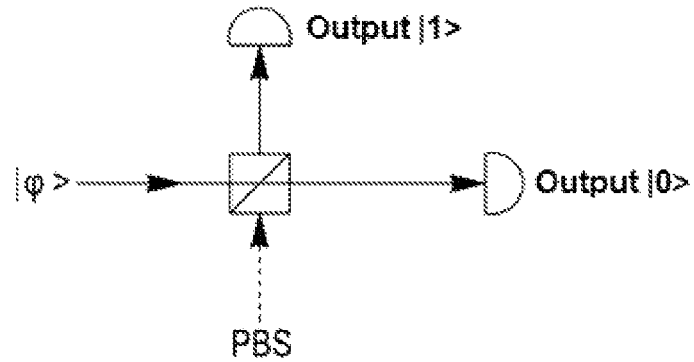
Figure 5C:
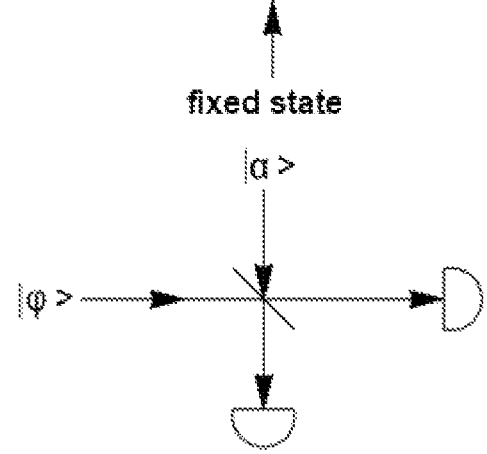
Figure 5D:
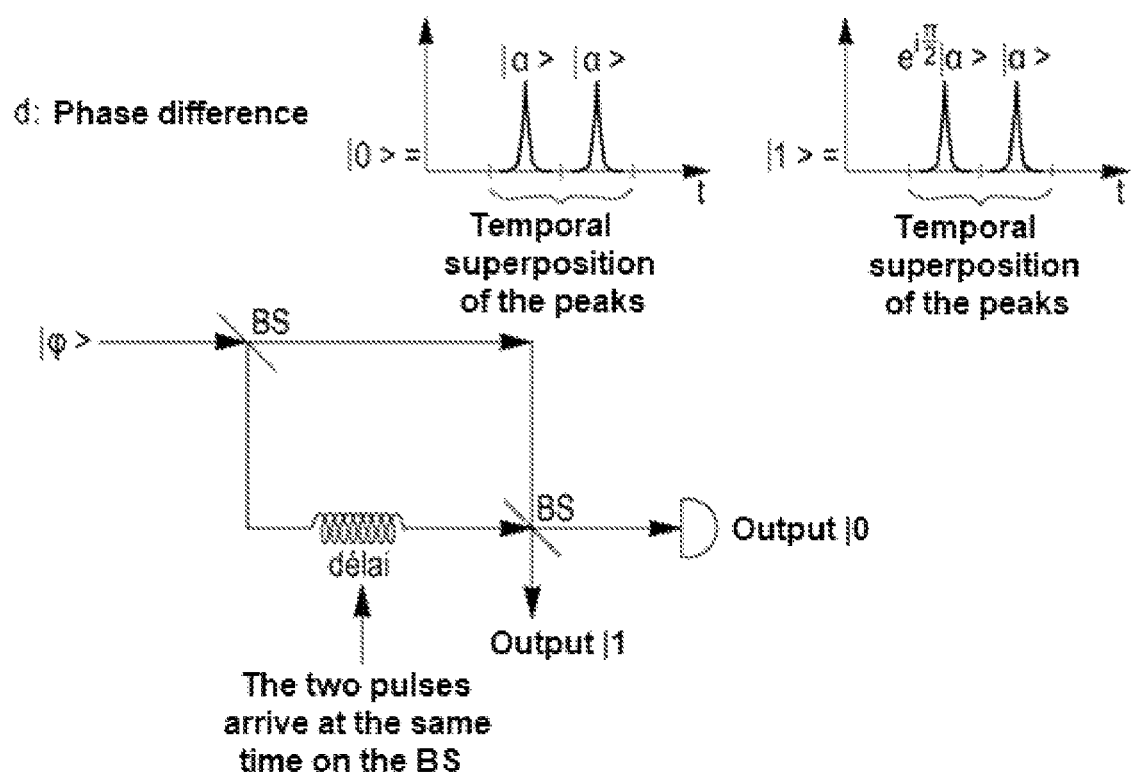
Figure 5E:
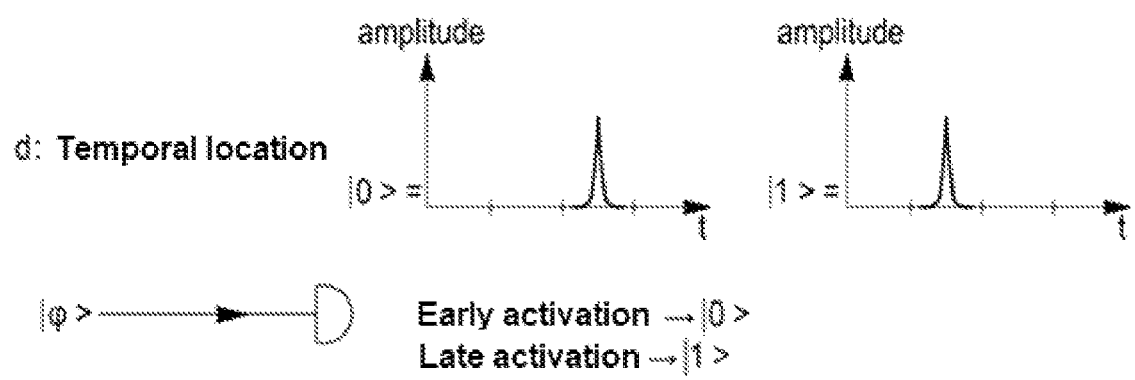
Figure 6:
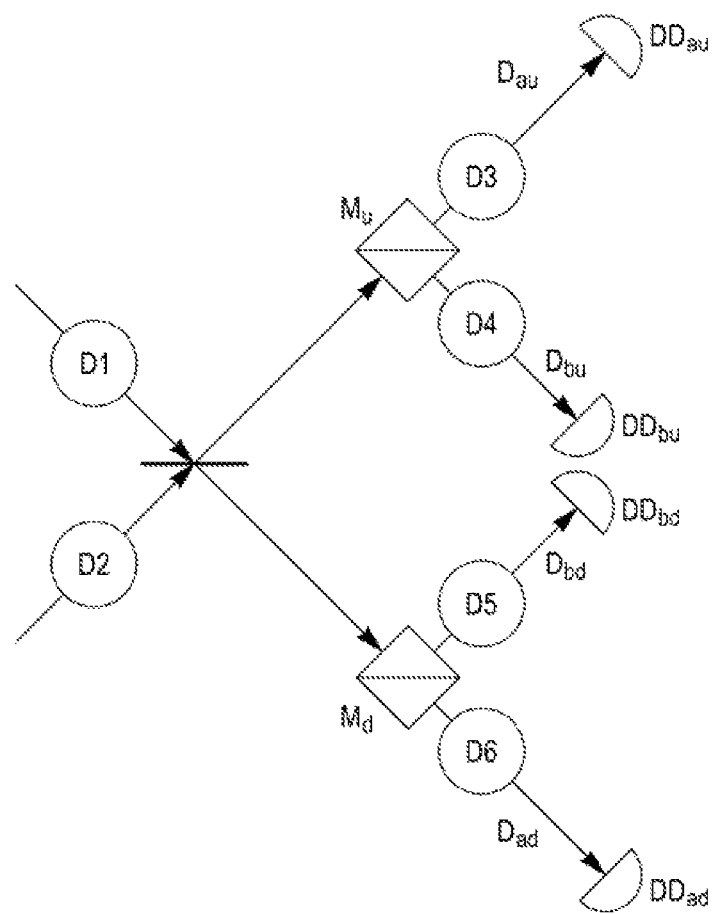

Other advantages and particularities of the present invention shall result from the following description, given as a non-limiting example and given in reference to the accompanying figures:

FIG. 1 diagrammatically shows the different steps of a first embodiment of a method for the secure generation of a quantum state Ef by a quantum server S delegated by a client C;

FIG. 2 diagrammatically shows the different steps of the method for the secure generation of a quantum state Ef according to a first alternative of the first embodiment shown in FIG. 1;

FIG. 3 diagrammatically shows the different steps of the method for the secure generation of a quantum state Ef according to a second alternative of the first embodiment shown in FIG. 1;

FIG. 4 shows a beam splitter, whereon two photons are incident, and for which a delay D along one of the input faces is activated (left) or not (right);

FIG. 5a diagrammatically shows a first means Mu or Md of spatial splitting of 2 different degrees of freedom Da and Db for a photon, when the degree of freedom chosen is the frequency of the photon;

FIG. 5b diagrammatically shows a first means Mu or Md of spatial splitting of 2 different degrees of freedom Da and Db for a photon, when the degree of freedom chosen is the polarisation of the photon;

FIG. 5c diagrammatically shows a first means Mu or Md of spatial splitting of 2 different degrees of freedom Da and Db for a photon, when the degree of freedom chosen is the phase of the photon;

FIG. 5d diagrammatically shows a first means Mu or Md of spatial splitting of 2 different degrees of freedom Da and Db for a photon, when the degree of freedom chosen is the phase difference of the photon;

FIG. 5e diagrammatically shows a first means Mu or Md of spatial splitting of 2 different degrees of freedom Da and Db for a photon, when the degree of freedom chosen is the temporal location of the photon;

FIG. 6 shows a generic device of the embodiment of the method for the secure generation of a quantum state Ef by a quantum server S delegated by a client C, comprising two activation delays of the interaction between two photons emitted by two quantum bits, two means of spatial splitting of different degrees of freedom Da and Db, several delays configured to mask or not the activation or the non-activation of an interaction between two incident photons on the beam splitter, and several single photon detectors.

DETAILED DESCRIPTION

FIG. 1 diagrammatically shows the different steps of a first embodiment of a method for the secure generation of a quantum state Ef by a quantum server S delegated by a client C, comprising the following steps:

a/ preparing, by the quantum server S, in an initial quantum state E0 coded data in a degree of freedom d1 or d2 of photons emitted by a pair of quantum bits, where the degree of freedom d1, respectively d2, of each photon emitted is entangled with the quantum bit emitting the photon;

b/ sending, by the quantum server, to the client C the photons coming from the pair of quantum bits in the initial quantum state E0;

c/ activating or not, by the client C, an interaction between the photons emitted by the initial pair of quantum bits to generate a new quantum state Ec;

d/ masking or not, by the client C, the temporal data of said activation or non-activation and of said interaction or non-interaction between the photons emitted by the pair of quantum bits in such a way that said activation or non-activation and interaction or non-interaction remain private;

e/ measuring the degrees of freedom d1 and d2 of the photons in the quantum state Ec generated at step c/;

f/ obtaining following step e/ a final quantum state Ef of the quantum bits.

Experimentally, the quantum bits can be solid-state quantum bits carried out using trapped ions, doped diamonds or superconducting quantum bits emitting or coupled with photons via the application of an electromagnetic field.

"Degree of freedom of photons" means a physical property described by quantum mechanics and that can be used for quantum communications, such as the phase, the phase difference, the temporal location, the polarisation or the frequency of the photons.

In a favoured embodiment, the interaction between the photons emitted by the pair of quantum bits consists of a two-photon interference that is produced at the input of a beam splitter BS. FIG. 4 shows this interaction.

In a favoured embodiment also, the masking of the temporal data of said activation and of said interaction between the photons emitted by the pair of quantum bits is carried out by the introduction in steps c/ and d/ of delays, chosen by the client C, between the paths followed by each one of the photons coming from the pair of quantum bits in the initial quantum state Ea Thus, it is not possible to know if the two photons have interacted, the latter being shifted in time. In practice, these delays can be carried out by using delay lines, such as optical fibres.

Step e/ of the method for the secure generation of a quantum state Ef can be carried out either by the quantum server S, or by the client C. The objective sought in the present application consists of creating a quantum state known to the client but unknown to the quantum server S. Thus at least two alternatives of the first embodiment emerge, according to whether step e/ is carried out by the quantum server S or by the client C.

According to an alternative of the first embodiment shown in FIG. 1, the method for the secure generation of a quantum state Ef is characterised by the elements hereinbelow:

the masking of step d/ is carried out;

an intermediate step d'/ between the steps d/ and e/ is carried out, said step d'/ consisting in sending by the client C the photons in the quantum state Ec generated at step c/ to the quantum server S;

the step e/ of measuring degrees of freedom d1 and d2 of the photons in the quantum state Ec is carried out by the quantum server S;

an additional step g/ is carried out, said step g/ consisting of sending by the server S the result of the measurement taken at step e/ to the client C.

Thus, the object of the application is also a device for implementing the method for the secure generation of a quantum state Ef, wherein:

the quantum server S comprises:
    i. a generator of solid-state quantum bits emitting photons via the application of an electromagnetic field,
    ii. two first and second detectors of single photons DDau, DDbu, intended for delivering first measurement signals Dau, Dbu, and two third and fourth detectors of single photons DDad, DDbd, intended for delivering second measurement signals Dad, Dbd;

the client C comprises:
    i. a beam splitter BS being intended for receiving two photons emitted by the pair of quantum bits in the quantum state E0,
    ii. first and second delays D1 and D2 of the delay line type placed at the input of each one of the input faces of the beam splitter BS that can be activated by the client C and intended for introducing a temporal delay on the beam passing through them,
    iii. first and second means Mu and Md of spatial splitting of photons with different degrees of freedom da and db placed respectively at the output of each one of the reflection and transmission directions of the beam splitter (BS),
    iv. third and fourth delays D3 and D4 of the delay line type placed at the output of each one of the output faces of the first means Mu of spatial splitting of photons with different degrees of freedom da and db, that can be activated by the client C and intended for introducing a temporal delay on the beam passing through them,
    v. fifth and sixth delays D5 and D6 of the delay line type placed at the output of each one of the output faces of the second means Md of spatial splitting of photons with different degrees of freedom da and db, that can be activated by the client C and intended for introducing a temporal delay on the beam passing through them, in such a way that the beam splitter BS of the client C is placed at the output of the generator of solid-state quantum bits of the quantum server S and the third, fourth, fifth and sixth delays, D3, D4, D5 and D6 of the client C are respectively placed at the input of the first and second photon detectors Ddau, DDbu and of the third and fourth photon detectors DDad, DDbd of the quantum server S.

By way of examples, according to the degree of freedom of the photons chosen to implement the method for the secure generation of a quantum state Ef, the first and second means Mu and Md of spatial splitting of photons with different degrees of freedom da and db can be chosen from a demultiplexer, a polarisation beam splitter, an interference device of the asymmetric Mach Zehnder type, or a measurement of the photon arrival time on the single photon detectors Ddau, DDbu, DDad, DDbd of the quantum server S.

According to a second alternative of the first embodiment, the method for the secure generation of a quantum state Ef is characterised by the elements hereinbelow:

the masking of step d/ is not carried out;
the step e/ of measuring degrees of freedom d1 and d2 of the photons in the quantum state Ec is carried out by the client (C);
step f/ is produced following the measurement of the degrees of freedom d1 and d2 of the photons in the quantum state Ec due to the entanglement between the degrees of freedom d1 and d2 of the photons and the quantum bits from the quantum server S emitting them, said entanglement inducing a new quantum state Ef of the quantum bits.

This second alternative of the first embodiment is diagrammatically shown in the accompanying FIG. 3.

In this second alternative of the first embodiment, where step e/ of measuring in the method for the secure generation of a quantum state Ef is carried out by the client C, several activation configurations are possible. However, in this second alternative, there is no transmission of measurements from the client C to the quantum server S, therefore there is no masking phase.

So, an object of the application is also a device for the implementation of the method for the secure generation of a quantum state Ef, wherein the quantum server S comprises a generator of solid-state quantum bits emitting photons via the application of an electromagnetic field, and the client C comprises:

a beam splitter BS being intended for receiving two photons emitted by the pair of quantum bits in the quantum state E0,
first and second delays D1 and D2 of the delay line type placed at the input of each one of the input faces of the beam splitter BS that can be activated by the client C and intended for introducing a temporal delay on the beam passing through them,
first and second means Mu and Md of spatial splitting of photons with different degrees of freedom da and db placed respectively at the output of each one of the reflection and transmission directions of the beam splitter BS,
third and fourth delays D3 and D4 of the delay line type placed at the output of each one of the output faces of the first means Mu of spatial splitting of photons with different degrees of freedom da and db, preferably set to zero by the client C,
fifth and sixth delays D5 and D6 of the delay line type placed at the output of each one of the output faces of the second means Md of spatial splitting of photons with different degrees of freedom da and db, preferably set to zero by the client C,
two first and second detectors of single photons DDau, DDbu, intended for delivering first measurement signals Dau, Dbu, and two third and fourth detectors of single photons DDad, DDbd, intended for delivering second measurement signals Dad, Dbd, in such a way that the beam splitter BS of the client C is placed at the output of the generator of solid-state quantum bits of the quantum server S and the third, fourth, fifth and sixth delays, D3, D4, D5 and D6 of the client C are respectively placed at the input of the first and second photon detectors Ddau, DDbu and of the third and fourth photon detectors DDad, DDbd of the client C.

In the same way, according to the degree of freedom of the photons chosen to implement this second alternative of the embodiment shown in FIG. 1, the first and second means Mu and Md of spatial splitting of photons with different degrees of freedom da and db can be chosen from a demultiplexer, a polarisation beam splitter, an interference device of the asymmetric Mach Zehnder type, or a measurement of the photon arrival time on the single photon detectors Ddau or DDbu on the one hand, or DDad, DDbd on the other hand, of the quantum server S.

Several examples of first and second means Mu and Md of spatial splitting of photons with different degrees of freedom da and db are given immediately after. These examples will be shown in accompanying FIGS. 5a to 5e.

In the case where the degree of freedom d chosen is the frequency of the photons, such as shown in FIG. 5a, a demultiplexer can be used to spatially split deux photons that have a different frequency. For example, passive components such as a prism, or a diffraction grating, or a WDM (Wavelength Division Multiplexing) can disperse the two different frequencies in two different spatial directions.

In the case where the degree of freedom d chosen is the polarisation of the photons, such as shown in FIG. 5b, a polarisation beam splitter can be used to reflect a first polarisation in one direction, for example horizontal, and transmit a second polarisation in a second direction, for example vertical.

In the case where the degree of freedom d chosen is the phase, such as shown in FIG. 5c, a beam splitter can have a photon interact with another photon of a given quantum state $|\alpha\rangle$, with, at the output of this beam splitter two detectors DDau and DDbu, or DDad and DDbd, respectively detecting either a photon in the state $|\alpha\rangle$, or a photon in the state $e^{i\pi}|\alpha\rangle$.

In the case where the solid-state quantum bit does not generate a photon but a temporal succession of two photon pulses, and then the degree of freedom d chosen is the phase difference of the two pulses, such as shown in FIG. 5d, an interference carried out with an interferometer of the asymmetric Mach-Zehnder type can be carried out. This temporal succession of two photon pulses is a particular example of a quantum state resulting from the superposition of several base states, here in the number of two. This interference can be carried out using an interferometer of the asymmetric Mach-Zehnder type, comprising an input beam splitter and an output beam splitter and including in one of its arms an element that introduces a temporal delay, and consequently a phase shift between the two successive pulses. When the stream of the two pulses enters into the interferometer, the elements that introduces a temporal delay between the two pulses is configured in such a way that the two pulses are temporally superimposed and arrive simultaneously in the output beam splitter of the interferometer. The possible states resulting from this interference can be either a state superposing a predefined state $|\alpha\rangle$ with this same predefined state $|\alpha\rangle$ but delayed in time, or a state superposing the same predefined state $|\alpha\rangle$ with a phase-shifted state $\pi$ in relation to this state $|\alpha\rangle$ and temporally delayed in relation to the state $|\alpha\rangle$ of a phase shift $\pi$.

In the case where the degree of freedom d chosen is the temporal location of the photons, such as shown in FIG. 5e, a measurement of the arrival time of the photons on two single photon detectors DDu on the one hand, or DDd on the other hand, can be carried out. More precisely, the single photon detector DDu replaces the two single photon detectors DDau and DDbu, on the one hand, and the single photon detector DDd replaces the two single photon detectors DDad and DDbd.

EXAMPLES

Example 1

This example is a first embodiment of the first alternative described hereinabove, shown in FIG. 2, where step e/ of measuring in the method for the secure generation of a quantum state Ef is carried out by the quantum server S.

In this first embodiment, step c/ comprises the following sub-steps;
the client device C activates only the component D1;
two incident photons coming from the pair of quantum bits arrive on the beam splitter BS non-concurrently and propagate to the third, fourth, fifth or sixth delays D3, D4, D5 and D6, giving a resulting quantum state Ec;
the client C sends to the quantum server S the photons that have propagated to the third, fourth, fifth or sixth delays D3, D4, D5 and D6; in such a way that the quantum server S measures, in a random order of arrival, using the first, second, third and fourth photo detectors DDau, DDbu, DDad, DDbd, the degrees of freedom d1 and d2 of the photons in the quantum state Ec; and the quantum server S shares the measured final quantum state Ef of the pair of quantum bits with the client C.

Example 2

This example is a second embodiment of the first alternative described hereinabove, shown in FIG. 2, where step e/ of measuring in the method for the secure generation of a quantum state Ef is carried out by the quantum server S.

In this second embodiment step c/ comprises the following sub-steps:
the client device C activates only the component D2;
two incident photons coming from the pair of quantum bits arrive on the beam splitter BS non-concurrently and propagate in the device D, giving a resulting quantum state Ec;
the client C sends to the quantum server S the photons that have propagated to the third, fourth, fifth or sixth delays D3, D4, D5 and D6;
in such a way that the quantum server S measures, in a random order of arrival, using the first, second, third and fourth photo detectors DDau, DDbu, DDad, DDbd, the degrees of freedom d1 and d2 of the photons in the quantum state Ec; and the quantum server S shares the measured final quantum state Ef of the pair of quantum bits with the client C.

Example 3

This example is a third embodiment of the first alternative shown in FIG. 2, where step e/ of measuring in the method for the secure generation of a quantum state Ef is carried out by the quantum server S. It is based on the use of a beam splitter to have two separate particles interact together, in particular, between photons that were previously entangled with quantum bits, thus producing a Hong-Ou-Mandel effect. Entanglement can be created from this interaction by entanglement swapping to the quantum bits in the conditions hereinafter:
the two incident photons on the beam splitter BS are detected at the same output of the beam splitter;
the two photons have different degrees of freedom d1 and d2.

In this third embodiment step c/ comprises the following sub-steps:
the client C activates only the third and fourth delays D3 and D5;
two incident photons coming from the pair of quantum bits arrive on the beam splitter BS concurrently and propagate in the device D, said beam splitter BS creating entanglement between the two incident photons with a probability of 50% and said third and fifth delays D3 and D5 adding a temporal delay to the photons passing through them, thus giving a resulting quantum state Ec where the entanglement between the two quantum bits having emitted the photons is masked;

the client C sends to the quantum server S the photons that have propagated to the third, fourth, fifth or sixth delays D3, D4, D5 and D6 arriving in the quantum server S in the quantum state Ec;

in such a way that the quantum server S measures, in a non-predefined order of arrival using the first, second, third and fourth photo detectors DDau, DDbu, DDad, DDbd, the degrees of freedom d1 and d2 of the photons in the quantum state Ec; and the quantum server S shares the measured final quantum state Ef of the pair of quantum bits with the client C.

Example 4

This example is a fourth embodiment of the first alternative shown in FIG. 2, where step e/ of measuring in the method for the secure generation of a quantum state Ef is carried out by the quantum server S. It is based on the use of a beam splitter to have two separate particles interact together, in particular, between photons that were previously entangled with quantum bits, thus producing a Hong-Ou-Mandel effect. Entanglement can be created from this interaction by entanglement swapping to the quantum bits in the conditions hereinafter:

the two incident photons on the beam splitter BS are detected at the same output of the beam splitter;

the two photons have different degrees of freedom d1 and d2.

In this fourth embodiment step c/ comprises the following sub-steps:

the client C activates only the fourth and sixth delays D4 and D6;

two incident photons coming from the pair of quantum bits arrive on the beam splitter BS concurrently and propagate in the device D, said beam splitter BS creating entanglement between the two incident photons with a probability of 50% and said fourth and sixth D4 and D6 adding a temporal delay to the photons passing through them, thus giving a resulting quantum state Ec when the quantity of entanglement of the two photons is masked;

the client C sends to the quantum server S the photons that have propagated in the device to the third, fourth, fifth or sixth delays D3, D4, D5 and D6 arriving in the quantum server S in the state Ec;

in such a way that the quantum server S measures, in a non-predefined order of arrival using photon detectors DDau, DDbu, DDad, DDbd, the degrees of freedom d1 and d2 of the photons in the quantum state Ec; and the quantum server S shares the measured final quantum state Ef of the pair of quantum bits with the client C.

Example 5

This example is a first embodiment of the second alternative described hereinabove and shown in FIG. 3, where step e/ of measuring in the method for the secure generation of a quantum state Ef is carried out by the client C.

In this first embodiment step c/ comprises the following sub-steps;

the client device C activates only the component D1;

two incident photons coming from the pair of quantum bits arrive on the beam splitter BS non-concurrently and propagate to the third, fourth, fifth or sixth delays D3, D4, D5 and D6, preferably set to zero, giving a resulting quantum state Ec;

the client C measures, in a random order of arrival, using the first, second, third and fourth photo detectors DDau, DDbu, DDad, DDbd, the degrees of freedom d1 and d2 of the photons in the quantum state Ec;

where the new quantum state Ef of the quantum bits of the quantum server S is thus obtained due to the entanglement of the degrees of freedom of the photons with the quantum bits of the quantum server S and the measurement of the degrees of freedom of the photons by the client C.

Example 6

This example is a second embodiment of the second alternative described hereinabove and shown in FIG. 3, where step e/ of measuring in the method for the secure generation of a quantum state Ef is carried out by the client C.

In this second embodiment step c/ comprises the following sub-steps:

the client device C activates only the component D2;

two incident photons coming from the pair of quantum bits arrive on the beam splitter BS non-concurrently and propagate to the third, fourth, fifth or sixth delays D3, D4, D5 and D6, preferably set to zero, giving a resulting quantum state Ec;

the client C measures, in a random order of arrival, using the first, second, third and fourth photo detectors DDau, DDbu, DDad, DDbd, the degrees of freedom d1 and d2 of the photons in the quantum state Ec;

where the new quantum state Ef of the quantum bits of the quantum server S is thus obtained due to the entanglement of the degrees of freedom of the photons with the quantum bits of the quantum server S and the measurement of the degrees of freedom of the photons by the client C.

The invention claimed is:

1. Method for the secure generation of a quantum state (Ef) by a quantum server (S) delegated by a client (C), said generation method being characterised in that said generation method comprises the following steps:

a/ preparing, by the quantum server (S), in an initial quantum state (E0), coded data in degrees of freedom (d1) and (d2) of photons emitted by a pair of quantum bits, where the degree of freedom (d1) or (d2) of each photon emitted is entangled with the quantum bit emitting the photon;

b/ sending, by the quantum server (S), to the client (C) the photons coming from the pair of quantum bits in the initial quantum state (E0);

c/ in response to activating, by the client (C), an interaction between the photons emitted by the pair of quantum bits in the initial quantum state to generate a new quantum state (Ec);

d/ masking from the quantum server (S) or not, by the client (C), a temporal data of said activation and of said interaction between the photons emitted by the pair of quantum bits in such a way that said activation and said interaction remain private;

e/ measuring the degrees of freedom (d1) and (d2) of the photons in the quantum state (Ec) generated at step c/, wherein said masking is carried out when said measuring is performed by said quantum server (S) and said masking is not carried out when the measuring is performed by said client (C);

f/ obtaining following step e/ a final quantum state (Ef) of the pair of quantum bits.

2. Method for the secure generation of a quantum state (Ef) according to claim 1, wherein:
- the degrees of freedom (d1) and (d2) of the emitted photons are chosen from the polarisation, the frequency, the temporal location, the phase difference;
- the interaction at step c/ between the photons emitted by the pair of quantum bits consists of a two-photon interference that is produced at the input of a beam splitter (BS); and
  - the masking of the temporal data of said activation and of said interaction between the photons emitted by the pair of quantum bits is carried out by the introduction at step d/ of delays, chosen by the client (C), between the paths followed by each one of the photons coming from the pair of quantum bits in the initial quantum state (E0).

3. Method for the secure generation of a quantum state (Ef) according to claim 1 wherein:
- the masking of step d/ is carried out;
- an intermediate step d'/ between the steps d/ and e/ is carried out, said step d'/ consisting in sending by the client (C) the photons in the quantum state (Ec) generated at step c/ to the quantum server (S);
- the step e/ of measuring degrees of freedom (d1) and (d2) of the photons in the quantum state (Ec) is carried out by the quantum server (S);
- an additional step g/ is carried out, said step g/ consisting in sending by the quantum server (S) the result of the measurement taken at step e/ to the client (C).

4. Device adapted to implement the method for the secure generation of a quantum state (Ef) according to claim 3, comprising:
- a quantum server (S) comprising:
  a. a generator of solid-state quantum bits configured to generate a pair of quantum bits in an initial state (E0),
  b. two first and second detectors of single photons (DDau), (DDbu), configured to deliver first measurement signals (Dau), (Dbu), and two third and fourth detectors of single photons (DDad), (DDbd), configured to deliver second measurement signals (Dad), (Dbd);
- a client (C) comprising:
  a. a beam splitter (BS) being configured to receive two photons emitted by the pair of quantum bits in the quantum state (E0),
  b. first and second delays (D1) and (D2) of the delay line type placed at the input of each one of the input faces of the beam splitter (BS) that can be activated by the client (C) and configured to introduce a temporal delay on the beam passing through them,
  c. first and second means (Mu) and (Md) of spatial splitting of photons with different degrees of freedom (da) and (db) placed respectively at the output of each one of the reflection and transmission directions of the beam splitter (BS),
  d. third and fourth delays (D3) and (D4) of the delay line type placed at the output of each one of the output faces of the first means (Mu) of spatial splitting of photons with different degrees of freedom (da) and (db), that can be activated by the client (C) and configured to introduce a temporal delay on the beam passing through them
  e. fifth and sixth delays (D5) and (D6) of the delay line type placed at the output of each one of the output faces of the second means (Md) of spatial splitting of photons with different degrees of freedom (da) and (db), that can be activated by the client (C) and configured to introduce a temporal delay on the beam passing through them, such that the beam splitter (BS) of the client (C) is placed at the output of the generator of solid-state quantum bits of the quantum server (S) and the third, fourth, fifth and sixth delays, (D3), (D4), (D5) and (D6) of the client (C) are respectively placed at the input of the first and second photon detectors (DDau), (DDbu) and of the third and fourth photon detectors (DDad), (DDbd) of the quantum server (S).

5. Device adapted to implement the method for the secure generation of a quantum state (Ef) according to claim 4, wherein the first and second means (Mu) and (Md) of spatial splitting of photons with different degrees of freedom (da) and (db) are chosen from a demultiplexer, a polarisation beam splitter, an interference device of the asymmetric Mach Zehnder type, or a measurement of the photon arrival time.

6. Method for the secure generation of a quantum state (Ef) using the device according to claim 4, wherein step c/ comprises the following sub-steps:
- the client device (C) activates only the component (D1);
- two incident photons coming from the pair of quantum bits arrive on the beam splitter (BS) non-concurrently and propagate to the third, fourth, fifth or sixth delays (D3), (D4), (D5) and (D6), giving a resulting quantum state (Ec);
- the client (C) sends to the quantum server (S) the photons that have propagated to the third, fourth, fifth or sixth delays (D3), (D4), (D5) and (D6);
- in such a way that the quantum server (S) measures, in a random order of arrival, using the first, second, third and fourth photo detectors (DDau), (DDbu), (DDdad), (DDbd), the degrees of freedom (d1) and (d2) of the photons in the quantum state (Ec); and
- the quantum server (S) shares the measured final quantum state (Ef) of the pair of quantum bits with the client (C).

7. Method for the secure generation of a quantum state (Ef) using the device according to claim 4 wherein step c/ comprises the following sub-steps:
- the client device (C) activates only the component (D2);
- two incident photons coming from the pair of quantum bits arrive on the beam splitter (BS) non-concurrently and propagate in the device (D), giving a resulting quantum state (Ec);
- the client (C) sends to the quantum server (S) the photons that have propagated to the third, fourth, fifth or sixth delays (D3), (D4), (D5) and (D6);
in such a way that the quantum server (S) measures, in a random order of arrival, using the first, second, third and fourth photo detectors (DDau), (DDbu), (DDad), (DDbd), the degrees of freedom (d1) and (d2) of the photons in the quantum state (Ec); and the quantum server (S) shares the measured final quantum state (Ef) of the pair of quantum bits with the client (C).

8. Method for the secure generation of a quantum state (Ef) using the device according to claim 4 wherein step c/ comprises the following sub-steps:
- the client (C) activates only the third and fourth delays (D3) and (D5);
- two incident photons coming from the pair of quantum bits arrive on the beam splitter (BS) concurrently and propagate in the device (D), said beam splitter (BS) creating entanglement between the two incident photons with a probability of 50% and said third and fifth delays (D3) and (D5) adding a temporal delay to the photons passing through them, thus giving a resulting quantum state (Ec) when the quantity of entanglement of the two photons is masked;

the client (C) sends to the quantum server (S) the photons that have propagated in the device to the third, fourth, fifth or sixth delays (D3), (D4), (D5) and (D6) arriving in the quantum server (S) in the quantum state (Ec);

in such a way that the quantum server (S) measures, in a non-predefined order of arrival using the first, second, third and fourth photo detectors (DDau), (DDbu), (DDad), (DDbd), the degrees of freedom (d1) and (d2) of the photons in the quantum state (Ec); and the quantum server (S) shares the result of the previously-taken measurement of the degree of freedom of the photons detected emitted by the pair of quantum bits with the client (C).

9. Method for the secure generation of a quantum state (Ef) using the device according to claim 4, wherein step c/ comprises the following sub-steps:

the client (C) activates only the fourth and sixth delays (D4) and (D6);

two incident photons coming from the pair of quantum bits arrive on the beam splitter (BS) concurrently and propagate in the device (D), said beam splitter (BS) creating entanglement between the two incident photons with a probability of 50% and said fourth and sixth (D4) and (D6) adding a temporal delay to the photons passing through them, thus giving a resulting quantum state (Ec) when the quantity of entanglement of the two photons is masked;

the client (C) sends to the quantum server (S) the photons that have propagated in the device to the third, fourth, fifth or sixth delays (D3), (D4), (D5) and (D6) arriving in the quantum server (S) in the state (Ec);

in such a way that the quantum server (S) measures, in a non-predefined order of arrival using photon detectors (DDau), (DDbu), (DDad), (DDbd), the degrees of freedom (d1) and (d2) of the photons in the quantum state (Ec); and the quantum server (S) shares the result of the previously-taken measurement of the degree of freedom of the photons detected emitted by the pair of quantum bits with the client (C).

10. Method for the secure generation of a quantum state (Ef) using the device according to claim 9, wherein step c/ comprises the following sub-steps:

the client device (C) activates only the component (D2);

two incident photons coming from the pair of quantum bits arrive on the beam splitter (BS) non-concurrently and propagate to the third, fourth, fifth or sixth delays (D3), (D4), (D5) and (D6), giving a resulting quantum state (Ec);

the client (C) measures, in a random order of arrival, using the first, second, third and fourth photo detectors (DDau), (DDbu), (DDad), (DDbd), the degrees of freedom (d1) and (d2) of the photons in the quantum state (Ec);

where the new quantum state (Ef) of the quantum bits of the quantum server (S) is thus obtained due to the entanglement of the degrees of freedom of the photons with the quantum bits of the quantum server (S) and the measurement of the degrees of freedom of the photons by the client (C).

11. Device adapted to implement the method for the secure generation of a quantum state (Ef) according to claim 3, comprising a client device (C) included in a sealed housing.

12. Method for the secure generation of a quantum state (Ef) according to claim 1 wherein:

the masking of step d/ is not carried out;

the step e/ of measuring degrees of freedom (d1) and (d2) of the photons in the quantum state (Ec) is carried out by the client (C);

step f/ is produced following the measurement of the degrees of freedom (d1) and (d2) of the photons in the quantum state (Ec) due to the entanglement between the degrees of freedom (d1) and (d2) of the photons and the quantum bits from the server (S) emitting them, said entanglement inducing a new quantum state (Ef) of the quantum bits.

13. Device adapted to implement the method for the secure generation of a quantum state (Ef) according to claim 12, comprising a quantum server (S) comprising a generator of solid-state quantum bits configured to generate a pair of quantum bits in a quantum state (E0), and a client (C) comprising:

a beam splitter (BS) being configured to receive two photons emitted by the pair of quantum bits in the quantum state (E0), first and second delays (D1) and (D2) of the delay line type placed at the input of each one of the input faces of the beam splitter (BS) that can be activated by the client (C) and configured to introduce a temporal delay on the beam passing through them, first and second means (Mu) and (Md) of spatial splitting of photons with different degrees of freedom (da) and (db) placed respectively at the output of each one of the reflection and transmission directions of the beam splitter (BS), third and fourth delays (D3) and (D4) of the delay line type placed at the output of each one of the output faces of the first means (Mu) of spatial splitting of photons with different degrees of freedom (da) and (db), that can be activated by the client (C), fifth and sixth delays (D5) and (D6) of the delay line type placed at the output of each one of the output faces of the second means (Md) of spatial splitting of photons with different degrees of freedom (da) and (db), that can be activated by the client (C), two first and second detectors of single photons (DDau), (DDbu), intended for delivering first measurement signals (Dau), (Dbu), and two third and fourth detectors of single photons (DDad), (DDbd), intended for delivering second measurement signals (Dad), (Dbd), such that the beam splitter (BS) of the client (C) is placed at the output of the generator of solid-state quantum bits of the quantum server (S) and the third, fourth, fifth and sixth delays, (D3), (D4), (D5) and (D6) of the client (C) are respectively placed at the input of the first and second photon detectors (Ddau), (DDbu) and of the third and fourth photon detectors (Ddad), (Ddbd) of the client (C).

14. Device adapted to implement the method for the secure generation of a quantum state (Ef) according to claim 11, wherein the first and second means (Mu) and (Md) of spatial splitting of photons with different degrees of freedom (da) and (db) are chosen from a demultiplexer, a polarisation beam splitter, an interference device of the asymmetric Mach Zehnder type, or a measurement of the photon arrival time.

15. Method for the secure generation of a quantum state (Ef) using the device according to claim 13, wherein step c/ comprises the following sub-steps:

the client device (C) activates only the component (D1);

two incident photons coming from the pair of quantum bits arrive on the beam splitter (BS) non-concurrently and propagate to the third, fourth, fifth or sixth delays (D3), (D4), (D5) and (D6), giving a resulting quantum state (Ec);

the client (C) measures, in a random order of arrival, using the first, second, third and fourth photo detectors (DDau), (DDbu), (DDad), (DDbd), the degrees of freedom (d1) and (d2) of the photons in the quantum state (Ec);

where the new quantum state (Ef) of the quantum bits of the quantum server (S) is thus obtained due to the entanglement of the degrees of freedom of the photons with the quantum bits of the quantum server (S) and the measurement of the degrees of freedom of the photons by the client (C).

* * * * *